(12) United States Patent
Takatsuka et al.

(10) Patent No.: US 8,127,818 B2
(45) Date of Patent: Mar. 6, 2012

(54) METHOD AND APPARATUS OF JOINTING CORD FABRIC AND JOINTING HOLDER IN CALENDER LINE

(75) Inventors: Tomoyuki Takatsuka, Osaka (JP); Taizo Yamamoto, Osaka (JP); Makoto Koumo, Osaka (JP); Yu Hatayama, Osaka (JP)

(73) Assignee: Toyo Tire & Rubber Co., Ltd., Osaka-shi, Osaka (JP)

( * ) Notice: Subject to any disclaimer, the term of this patent is extended or adjusted under 35 U.S.C. 154(b) by 575 days.

(21) Appl. No.: 12/097,985

(22) PCT Filed: Dec. 20, 2005

(86) PCT No.: PCT/JP2005/023407
§ 371 (c)(1),
(2), (4) Date: Mar. 24, 2009

(87) PCT Pub. No.: WO2007/072555
PCT Pub. Date: Jun. 28, 2007

(65) Prior Publication Data
US 2009/0266476 A1    Oct. 29, 2009

(51) Int. Cl.
*B31F 5/06* (2006.01)
(52) U.S. Cl. ........ 156/505; 156/504; 156/178; 156/181; 156/158; 156/441; 156/161; 156/163; 156/162; 242/554.1; 242/556.1
(58) Field of Classification Search ................ 242/552, 242/554.1, 555.2, 555.3, 555.4, 555.5, 555.6, 242/555.7, 556, 556.1; 156/504, 505, 178, 156/181, 158, 180, 441, 161, 163, 164
See application file for complete search history.

(56) References Cited

U.S. PATENT DOCUMENTS

| 5,783,028 A * | 7/1998 | Kunimoto | 156/504 |
| 2009/0249598 A1* | 10/2009 | Tatara et al. | 28/212 |

FOREIGN PATENT DOCUMENTS

| JP | 48-45677 A | 6/1973 |
| JP | 07-34379 A | 2/1995 |
| JP | 2005-146433 A | 6/2005 |

OTHER PUBLICATIONS

International Search Report of PCT/JP2005/023407, date of mailing Mar. 28, 2006.

* cited by examiner

*Primary Examiner* — Linda L Gray
(74) *Attorney, Agent, or Firm* — Westerman, Hattori, Daniels & Adrian, LLP

(57) ABSTRACT

A method of jointing a cord fabric when the cord fabric for topping is alternately drawn from two supply positions for continuous supply. During drawing to supply of the cord fabric on one side, a start end portion of the cord fabric on other side is locked to hold by a locking pin of a jointing holder, and is set to a jointing mounting portion in a state where an unvulcanized jointing rubber member is pasted thereto. When a final end of the cord fabric on the one side comes closer, a finish end portion thereof is pasted to the start end portion of the cord fabric held by the holder by interposing the rubber member therebetween. The finish end portion and the start end portion are squeezed for joint from upper and lower sides by press members, thereafter, the holder is removed, and the cord fabric on the other side is drawn to supply continuously to the cord fabric on the one side.

3 Claims, 10 Drawing Sheets

METHOD AND APPARATUS OF JOINTING CORD FABRIC AND JOINTING HOLDER IN CALENDER LINE

TECHNICAL FIELD

The present invention relates to a method and an apparatus of jointing cord fabric, and a jointing holder in a calendar line for fabricating a topping sheet by aligning a number of pieces of cords and covering rubber thereon.

BACKGROUND ART

As a tire constituting member such as carcass ply of a tire or other industrial material, as shown by FIG. 11 and FIG. 12, there is used a so-called topping sheet A constituting core members for reinforcement by a number of pieces of cords C mainly made of a fabric and topping (covering) rubber R at least on one face (normally, both faces).

In a background art, as shown in FIG. 13, such a topping sheet A uses a so-called cord fabric F woven by constituting warp by the cord C made of a fabric or the like and striking slender weft W serving as a connection coarsely at required intervals in a longitudinal direction for the core member and is topped with rubber by a calendar apparatus while drawing to supply the cord fabric F continuously in a calendar line having a roll-type calendar apparatus as in Patent Reference 1.

Further, when the topping sheet using the cord fabric F for the core member is used for a tire constituting member such as carcass ply, not only the weft in the fabric does not effectively serve to reinforce the tire, but there is concern about deterioration of a tire function that a uniformity failure, a separation failure or the like of the tire is brought about by presence of the weft, and therefore, according to Patent Reference 1, in the calendar line, after removing the weft while transferring the cord fabric, rubber is topped thereon by passing only a number of pieces of cords to a portion of the roll type calendar apparatus in an aligned state.

Meanwhile, in the calendar line, the cord fabric is wound in a roll-like shape in a state of being subjected to predetermined heat treatment and adhering agent treatment and is supported by a cassette type carriage and set to a supply portion to be drawn to be supplied by driving the calendar line, in this case, when the cord fabric is drawn from one supply position, the carriage needs to be switched by stopping driving the calendar line each time the cord fabric of one piece of the carriage is terminated, and therefore, a waste margin of the cord fabric in accordance with stopping driving the calendar line is increased, further, also a driving stop time period is prolonged to bring about a reduction in a fabrication efficiency.

Therefore, generally, two pieces of the carriages for supporting roll-like wound members of the cord fabric are installed at two supply positions, and drawn to be supplied continuously alternately one by one.

In this case, although the carriage can be set to other supply position while drawing to supply the cord fabric from one carriage, when the one cord fabric has been finished to be drawn, it is necessary to joint a start end portion of the other cord fabric to a finish end portion thereof. It is desired that the jointing operation can easily be carried out and can firmly be carried out without stopping driving the calendar line.
Patent Reference 1: JP-A-7-34379

DISCLOSURE OF THE INVENTION

Problems that the Invention is to Solve

The invention provides a method and an apparatus of jointing cord fabric for drawing to supply the cord fabric woven by constituting warp by a cord constituting a core member alternately continuously from two supply positions, and a jointing holder used for jointing the cord fabric in a calendar line of fabricating a topping sheet constituting the core member by the reinforcement cord.

Means for Solving the Problems

The invention has been carried out in order to resolve the above-described problem and there is provided a method of jointing a cord fabric for drawing to supply a cord fabric constituted by being woven by constituting warp by a number of pieces of cords from two supply positions set to a supply portion alternately continuously one by one in a calendar line for topping rubber to a number of pieces of aligned cords by a calendar roll, wherein during drawing to supply of the cord fabric from one of the two supply positions, by using a jointing holder capable of holding a start end portion of the cord fabric in a stretched state, the start end portion of the cord fabric drawn from other thereof is held by the holder and set to a jointing mounting portion in a state of pasting an unvulcanized jointing rubber member to the start end portion, and when a final end of the cord fabric on one side comes closer, a finish end portion of the cord fabric on the one side is pasted to a start point of the cord fabric on other side held by the holder of the jointing mounting portion by interposing the jointing rubber member, the finish end portion and the start end portion are jointed by way of the rubber member by being squeezed from upper and lower sides, thereafter, by removing the holder, the cord fabric on the other side is made to be able to be drawn to be supplied continuously to the cord fabric on the one side.

According to the jointing method, pieces of the cord fabric can be drawn to be supplied respectively from the two supply positions while being jointed alternately continuously. Particularly, the start end portion of the cord fabric to be successively drawn is held by the jointing holder along with the jointing rubber member and set to the predetermined jointing mounting portion, and therefore, when a finish end portion of the cord fabric precedingly drawn to be supplied appears, the finish end portion can be jointed immediately to the start end portion by being pasted to be squeezed thereto and can be jointed thereto simply without stopping driving the calendar line.

In the jointing method, the jointing holder projected with a plurality of locking pins capable of piercing the cord fabric is used, and the start end portion of the cord fabric is set to the jointing mounting portion in a state of being locked to be held by the locking pins.

Thereby, the cord fabric can be held attachably and detachably by piercing to lock the cord fabric by the locking pins, and the finish end portion on the one side and the start end portion on the other side of the cord fabric can easily be removed after having been connected.

In the jointing method, a transfer portion reaching a drawing apparatus of the cord fabric on the one side drawn from the one of the supply positions and a transfer portion reaching the drawing apparatus of the cord fabric on the other side drawn from the supply position on the other side are made to be disposed at positions different from each other in an up and down direction, the jointing mounting portion is provided at a middle position of the transfer portions, when the cord fabric on the one side passing the transfer portion on an upper side is drawn, the jointing holder is set by directing the start end portion of the cord fabric on the other side held by the jointing holder to an upper side, further, when the cord fabric on the other side passing the transfer portion on a lower side is drawn to be supplied, the holder is set by directing the start end portion of the cord fabric on the one side held by the holder to a lower side.

Thereby, during drawing of the cord fabric respectively from one or other of the two supply positions provided to be aligned in a drawing direction, previously, the start end portion of the cord fabric on other or one side held by the jointing holder can be set to the jointing mounting portion to prepare. Therefore, when the cord fabric precedingly drawn as described above is terminated, the finish end portion is made to be able to be jointed immediately to the start end portion of the cord fabric held as described above.

Further, according to the invention, there is provided an apparatus of jointing a cord fabric for embodying the jointing method, wherein a transfer portion reaching a drawing apparatus of the cord fabric on one side drawn from the first supply position and a transfer portion reaching the drawing apparatus of the cord fabric on other side drawn from the second supply position are disposed at positions different from each other in an up and down direction, at a middle position of the two transfer portions, a jointing mounting portion capable of setting a jointing holder capable of holding a start end portion of the cord fabric in a stretched state is provided, and upper and lower portions of the jointing mounting portion are provided with press members capable of squeezing the start end portion on the cord fabric on the other side held by the jointing holder and a finish end portion of the cord fabric on the one side pasted thereto.

According to the jointing apparatus, when the cord fabric on the one side is drawn to be supplied, the start end portion of the cord fabric drawn from the supply position on the other side can be held by the jointing holder to be horizontally mounted to be set to the jointing mounting portion. Further, in the state of being set to the jointing mounting portion, the finish end portion and the start end portion of the cord fabric can be squeezed from upper and lower sides by the upper and lower press members, thereby, the jointing method can excellently be embodied.

Further, the invention provides a jointing holder used for jointing a cord fabric constituted by being woven by constituting warp by a number of pieces of cords, wherein the jointing holder is projected with a plurality of locking pins capable of piercing the cord fabric and constituted to be able to hold the start end portion of the cord fabric in a state of being stretched by being locked by the locking pin.

According to the jointing holder, the start end portion of the cord fabric drawn from the supply position can be held in the stretched state by being locked by the locking pin to be set to the jointing mounting position, the jointing method can excellently be carried out, and the holder after jointing the start end portion to the finish end portion of the cord fabric precedingly drawn is easily removed.

Particularly, as the jointing holder, it is preferable to include a frame-like member of a rectangular shape having a lateral width larger than a width of the cord fabric, wherein locking pins capable of piercing the cord fabric are aligned to be projected from respective one faces and provided to be able to lock to hold the start end portion of the cord fabric in a stretched state at two side portions opposed to each other on one side of the frame-like member.

According to the jointing holder, the start end portion of the cord fabric drawn from the supply position can stably be held by being locked by the locking pins provided to the two side portions opposed to each other on the one side in the stretched state, and can be set to be pasted to be jointed to the finish end portion on the one side in the state of being set to the jointing mounting portion with no problem.

Further, it is preferable that locking pins capable of piercing an unvulcanized jointing rubber member pasted to the start end portion of the cord fabric are aligned to be projected from two side portions opposed to each other on other side of the frame-like member. Thereby, the jointing rubber member can stably be held in the state of being pasted to the start end portion of the cord fabric held by the jointing holder.

Advantage of the Invention

As described above, according to the method and the apparatus of jointing the cord fabric in the calendar line of the invention, while drawing to supply the cord fabric on the other side of the cord fabric drawn from the two supply positions, by setting the start end portion of the cord fabric on the other side to the jointing mounting portion along with the jointing rubber member, when the final end of the cord fabric on the one side comes closer, the finish end portion and the start end portion can immediately be jointed easily. Particularly, the jointing can be carried out without stopping driving the calendar line, and the topping sheet can efficiently be fabricated while drawing to supply the cord fabric alternately continuously from the two supply positions.

Further, by using the jointing holder of the invention, the start end portion of the cord fabric constituting the jointing object can be held with excellent stability at the constant position in the expanded state by being locked to the locking pin and also the jointing rubber member pasted thereto can be held with excellent stability in the pasted state by being locked to the locking pin.

Therefore, the side of the start end portion can be set in the state of being directed to the lower side with no problem, and the finish end portion and the start end portion of the two pieces of the cord fabric can be jointed by alternately making the finish end portion and the start end portion disposed on upper and lower sides with no problem by setting the jointing mounting portion to the middle of the portions of transferring the two pieces of the cord fabric at the positions which differ in the up and down direction.

BEST MODE FOR CARRYING OUT THE INVENTION

Next, an embodiment of the invention will be explained based on an example shown by drawings.

FIG. 1 shows an outline of a calendar line which is a calendar line for fabricating the topping sheet A as shown by FIG. 11 and FIG. 12 used for a tire constituting member such as carcass ply of a tire, in which particularly, the weft W connecting the respective cords C is removed from the cord fabric F as shown by FIG. 13 constituted by being woven by constituting warp by the cord C constituting the core member for reinforcement, thereafter, topping of the rubber R is performed at least on one face (both faces in the drawing) thereof.

In FIG. 1, reference numeral 10 designates a supply portion of the cord fabric F as shown in FIG. 13 woven using the cord C made of a number of fibers for warp and by arranging weft W at required intervals in a longitudinal direction, and 15 designates an apparatus of drawing the cord fabric F. The cord fabric F is provided with a width in correspondence with a width of the topping sheet A constituting an object of fabrication and is supported by a cassette type carriage 11 by being wound in a roll-like shape in a state of being subjected to predetermined heat treatment and adhering agent treatment. Further, as the cord fabric F, there is normally used a cord fabric obtained by cutting a wide cord fabric into a cord fabric with necessary width to wind although depending on the width.

The supply portion 10 is aligned to be provided with two first and second supply positions P1 and P2 capable of installing two pieces of carriages 11, 11 for drawably supporting the cord fabric F wound in the roll-like shape in a drawing direction, and the cord fabric F, F supported by the carriages 11, 11 installed at respective supply positions P1 and P2 in drawn by the drawing apparatus 15 to be supplied to successive portion of the calendar apparatus. Numerals 12, 12 in the drawing designate guides for installing the carriages 11, 11 and numerals 13, 13 designate winding portions of separating cloth for restraining adherence in a state of winding the cord fabric F, F.

An apparatus 20 of jointing the cord fabric F drawn to be supplied as described above is provided between the supply portion 10 and the drawing apparatus 15, and when the cord fabric F of the carriage 11 at one of the first or the second supply position P1 or P2 is terminated, and the apparatus 20 joints a start end portion Fa of the cord fabric F of the carriage 11 at other supply position P2 or P1 to the finish end portion Fb.

Numeral 30 in the drawing designates a festoon apparatus, and an end portion on a delivery side of the apparatus is provided with a centering apparatus 31 of the cord fabric F. Numeral 40 designates a weft removing apparatus which is provided behind the festoon apparatus 30 and is provided for finely divide the weft W provided to the cord fabric F by a few centimeters to be separated to remove from the cord C as described later. Numeral 50 designates a roll type calendar apparatus for topping a rubber R from upper and lower faces of the cord C by passing a number of pieces of the cords C removed of the weft W at the weft removing apparatus 40 and transferred by way of a dancer apparatus 45 or the like to between a pair of calendar rolls 51, 51 in an aligned state. Numeral 60 designates a cooling apparatus of the topping sheet A topped with rubber by passing the calendar apparatus 50 and transferred by way of a dancer apparatus 55, numeral 70 designates a festoon apparatus behind it and an end portion on a delivery side of the festoon apparatus 70 is provided with a centering apparatus 71 of the topping sheet A. Numeral 80 designates a reeling apparatus which is provided to reel the topping sheet A transferred by being centered by the centering apparatus 71 to a reel carriage 81. In the drawing, the reel apparatus 80 is installed with two pieces of reel carriages 81, 81 aligned in a front and rear direction and the topping sheet A is reeled alternately one by one thereto. Numeral 82 designates a reel position switching apparatus which switches a reeling position of the topping sheet A to positions of the respective carriages and is provided movably in the front and rear direction.

Further, the jointing apparatus 20 for jointing two pieces of the cord fabric F, F drawn to be supplied alternately from the two supply positions P1 and P2 is constructed by the following constitution.

A transfer portion 1L of one piece of the cord fabric F drawn from the first supply position P1 and reaching the drawing apparatus 15 and a transfer portion 2L of other piece of the cord fabric F drawn from the second supply position P2 and reaching the drawing apparatus 15 are made to differ from each other in positions thereof in the up and down direction, and the transfer portion 1L of the one piece of cord fabric F is set to an upper side and the transfer portion 2L of the other piece of cord fabric F is set to a lower side. Numerals 17 and 18 in the drawing designate guide rollers for respectively drawing the pieces of the cord fabric F, F.

As shown by FIG. 2 and FIG. 5, the drawing apparatus 15 is constituted by a pair of upper and lower transferring rollers 15a and 15b which can be rotated in synchronism with each other, which are constituted to be able to draw to supply the cord fabric F hung to the two rollers 15a and 15b from the two first and second supply positions P1 and P2 by way of the guide roller 17 or 18 respectively at a predetermined speed by being driven to rotate by a drive motor 16 connected to the roller 15a on one side. The drawing apparatus 15 is provided such that positions of the transfer portions 1L and 2L reaching the transfer roller 15a of the drawing apparatus 15 from the guide rollers 17 and 18 are disposed at positions different from each other in the up and down direction.

Further, a middle portion between the upper and lower transfer portions 1L and 2L reaching the drawing apparatus 15 from the guide rollers 17 and 18 at the jointing apparatus 20 is provided with a jointing mounting portion 21 capable of horizontally mounting to set a jointing holder 1 constructed by the following constitution.

As shown in FIG. 3 and FIG. 4, the jointing holder 1 includes a frame-like member 2 constituted by a plate member constituting a shape of a rectangular ring having a lateral width larger than a width of the cord fabric F, at two side portions 2a, 2a opposed to each other on one side constituting sides of long sides of the frame-like member 2, locking pins 3 in a needle-like shape capable of piercing the cord fabric F are aligned to be projected at respective one faces thereof and provided to be able to hold the start end portion Fa of the cord fabric F in a stretched state by locking the start end portion Fa by the locking pins 3. Normally, the locking pins 3 are projected over a range wider than the width of the cord fabric F constituting an object of jointing. The locking pin 3 is provided with a head portion 3a in a shape of a small ball a diameter of which is widened at a pin front end portion since the locking pin 3 needs to hold the comparatively coarsely woven cord fabric F in a locking state to hold to be directed in a lower direction, and the cord fabric F pierced to be locked by the locking pin 3 can be held with excellent stability in the locking state even when the cord fabric F pierced to be locked thereby is directed in the lower direction.

Further, at two side portions 2b, 2b opposed to each other on other side of the frame-like member 2, locking pin 4 capable of piercing unvulcanized rubber member Ra for jointing which is pasted to the start end portion Fa of the cord fabric F are aligned to be projected to one faces thereof, particularly, faces thereof on the same sides as the projecting sides of the locking pins 3. Normally, the locking pins 4 are formed over the same range as a width of the rubber member Ra, or a range slightly wider than the width of the rubber member Ra. Therefore, a dimension on a short side of the frame-like member 2 is formed to be slightly larger than the width of the rubber member Ra.

Although it is not necessarily needed that the jointing holder 1 is constituted by the frame shape as shown in the drawing, and it is not necessary that the jointing holder 1 holds the cord fabric F by locking the cord fabric F by the locking pins, practically, it is preferable in view of a holding performance of a state of stretching the cord fabric F and an easiness in a locking operation to form the rectangular locking pins at the two side portions opposed to each other on one side as described above.

The jointing mounting portion 21 of the jointing apparatus 20 is constituted by providing receiving plates 23, 23 opposed to each other on inner sides of both side portions of the frame 22 and projected to a side of the supply portion 10 to be able to mount and set the jointing holder 1 of the above-described constitution and is made to be able to receive and support both end portions in a longitudinal direction of the jointing holder 1 to hold substantially horizontally. It is preferable that the receiving plates 23, 23 are recessed by an amount in correspondence with a thickness of the frame-like member 2 at mounting face portions on the receiving plates, or positioning means of projections or the like are provided on the receiving plates so as to hold the jointing holder 1 mounted as above at a given position.

Upper and lower portions of the jointing mounting portion 21 are provided with press members 25, 26 capable of squeezing the start end portion Fa of the cord fabric F held by the jointing holder 1 and the finish end portion Fb of the cord fabric F on one side pasted thereto at inside of a frame of the frame-like member 2 of the jointing holder 1. The press members 25 and 26 are respectively provided continuously to output shafts of cylinder apparatus 27 and 28, the press member 25 on an upper side is extractably and retractably provided to be directed to a lower side, further, the press member 26 on a lower side is extractably and retractably provided to be directed to an upper side and to be respectively opposed to each other and the start end portion Fa and the finish end portion Fb of the cord fabric F are made to be able to be squeezed at inside of the frame-like member 2 by an extracting operation by operating the two cylinder apparatuses 27 and 28. Press faces of the two press members 25 and 26 constitute a rectangular shape having a lateral width substantially the same as the width of the cord fabric F and a size the same as or slightly larger than a width of the jointing rubber member Ra and capable of being fitted into the frame of the frame-like member 2 and are provided to be able to carry out jointing by one press operation.

When the topping sheet A is fabricated by the calendar line of FIG. 1 including the jointing apparatus 20 of the above-described embodiment, the topping sheet A is fabricated by drawing the pieces of cord fabric F woven by constituting the warp by the cord C from the carriages 11, 11 at the two first and second supply positions P1 and P2 set at the supply portion 10 by the drawing apparatus 15 alternately continuously one by one to supply to the successive calendar apparatus 50 and topping it with rubber.

At this occasion, the piece of the cord fabric F on one side of the two supply positions P1 and P2, for example as shown in FIG. 5, the cord fabric F on one side at the first supply position P1 is drawn to be supplied by passing the transfer portion 1L on the upper side, a portion of the jointing apparatus 20 between the supply portion 10 and the drawing apparatus 15 is set as follows by using the jointing holder 1 of the above-described embodiment. That is, the start end portion Fa of the cord fabric F drawn from the second supply position P2 on other side is held in a state of being stretched by being locked by the locking pins 3 provided at the two side portions 2a, 2a opposed to each other on the long side of the jointing holder 1, further, the unvulcanized jointing rubber member Ra is pasted to the start end portion Fa to be held to be locked by the locking pins 4 provided to the two side portions 2b, 2b on, for example, the short side. Under the state, as shown by FIG. 5 through FIG. 7, the holder 1 is set to the jointing mounting portion 21 of the jointing apparatus 20 to be directed to the upper side to make the start end portion Fa of the cord fabric F held by the holder 1 opposed to the transfer portion 1L to be prepared for jointing.

In this way, when the final end of the cord fabric F on one side which is drawn to be supplied as described above comes closer, the drawing apparatus 15 stops drawing the cord fabric F, while continuing to supply the cord fabric F to a portion of the calendar apparatus 50 by an amount thereof held by the festoon apparatus 30 or the like, the finish end portion Fb of the cord fabric F is pasted to the start end portion Fb of the cord fabric F on other side held by the holder 1 of the jointing mounting portion 21 by interposing the jointing rubber member Ra, and the finish end portion Fb and the start end portion Fb are jointed by way of the rubber member Ra by being squeezed from upper and lower sides by the upper and the lower press members 25 and 26. Thereafter, the holder 1 is removed, and the cord fabric F on other side is drawn to be supplied continuous to the cord fabric F on one side by operating the drawing apparatus 15.

Further, contrary to the above-described construction, when the cord fabric F at the second supply position P2 is drawn to be supplied by passing the transfer portion 2L on the lower side as shown in FIG. 8, the portion of the jointing apparatus 20 is set as follows by using the jointing holder 1. That is, the start end portion Fa of the cord fabric F drawn from the first supply position P1 is held in a state of being stretched by being locked by the locking pins 3 provided to the two side portion 2a, 2a of the jointing holder 1, further, held in a state of pasting the unvulcanized rubber member Ra to the start end portion Fa by being locked by the locking pin 4. Under the state, as shown in FIG. 8 through FIG. 10, the holder 1 is set to the jointing mounting portion 21 of the jointing apparatus 20 to be directed to the lower side to make the side of the start end portion Fa of the cord fabric F held by the holder 1 opposed to the transfer portion 2L.

In this way, as described above, when the final end of the cord fabric F which is drawn to be supplied comes closer, the drawing apparatus 15 stops drawing the cord fabric F, while continuing to supply the cord fabric F to the portion of the calendar apparatus 50 by an amount thereof held by the festoon apparatus 30 or the like, the finish end portion Fb of the cord fabric F is pasted to the start end portion Fa of the cord fabric F held by the holder 1 of the jointing mounting portion 21 by interposing the jointing rubber member Ra, and squeezed from upper and lower sides by the upper and lower press members 25 and 26 to joint the finish end portion Fb and the start end portion Fa by way of the rubber member Ra.

In this way, while drawing the cord fabric F respectively from one or other of the two supply positions P1 and P2 provided to be aligned in the drawing direction, previously, the start end portion Fa of other or one piece of the cord fabric F held by the jointing holder 1 can be set to the jointing mounting portion 21 to prepare. Therefore, when the cord fabric F precedingly drawn is terminated as described above, the finish end portion Fb can immediately be jointed to the start end portion of the cord fabric held as described above and jointing can be carried out without stopping driving the calendar line.

Further, the carriage 11 supporting the cord fabric F wound in the roll-like shape is newly switched to be installed to the vacated supply position P1 or P2, and the cord fabric F is prepared for jointing as described above. Thereafter, the cord fabric on other side is made to be able to be drawn to be supplied continuously to the cord fabric on one side by removing the holder 1. In this way, topping can continuously be carried out while continuously drawing to supply the cord fabric F from the two supply positions P1 and P2 alternately repeatedly one by one.

INDUSTRIAL APPLICABILITY

The invention can preferably be utilized for jointing for continuously supplying the cord fabric when the topping sheet is fabricated by topping rubber to the cord row member constituted by cord fabric woven by constituting warp by the cord constituting the core member for reinforcement.

DESCRIPTION OF REFERENCE NUMERALS AND SIGNS

Figure 1:
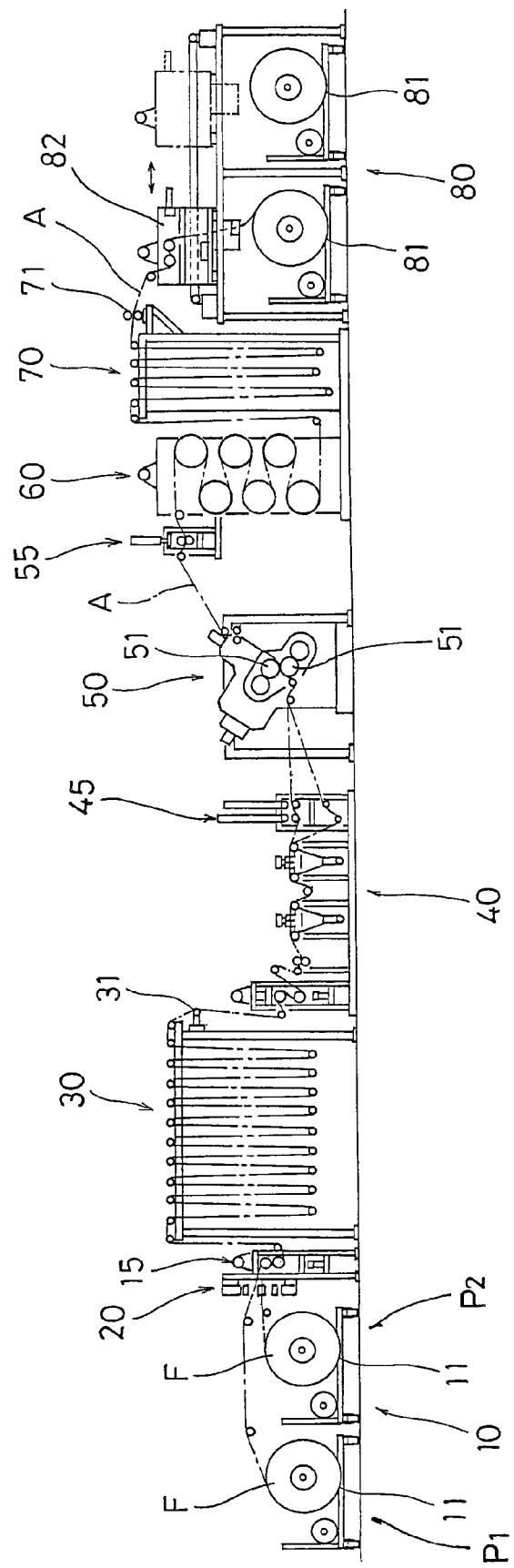
FIG. 1 is a step view showing an outline of a calendar line for fabricating a topping sheet which does not include weft.
Figure 2:
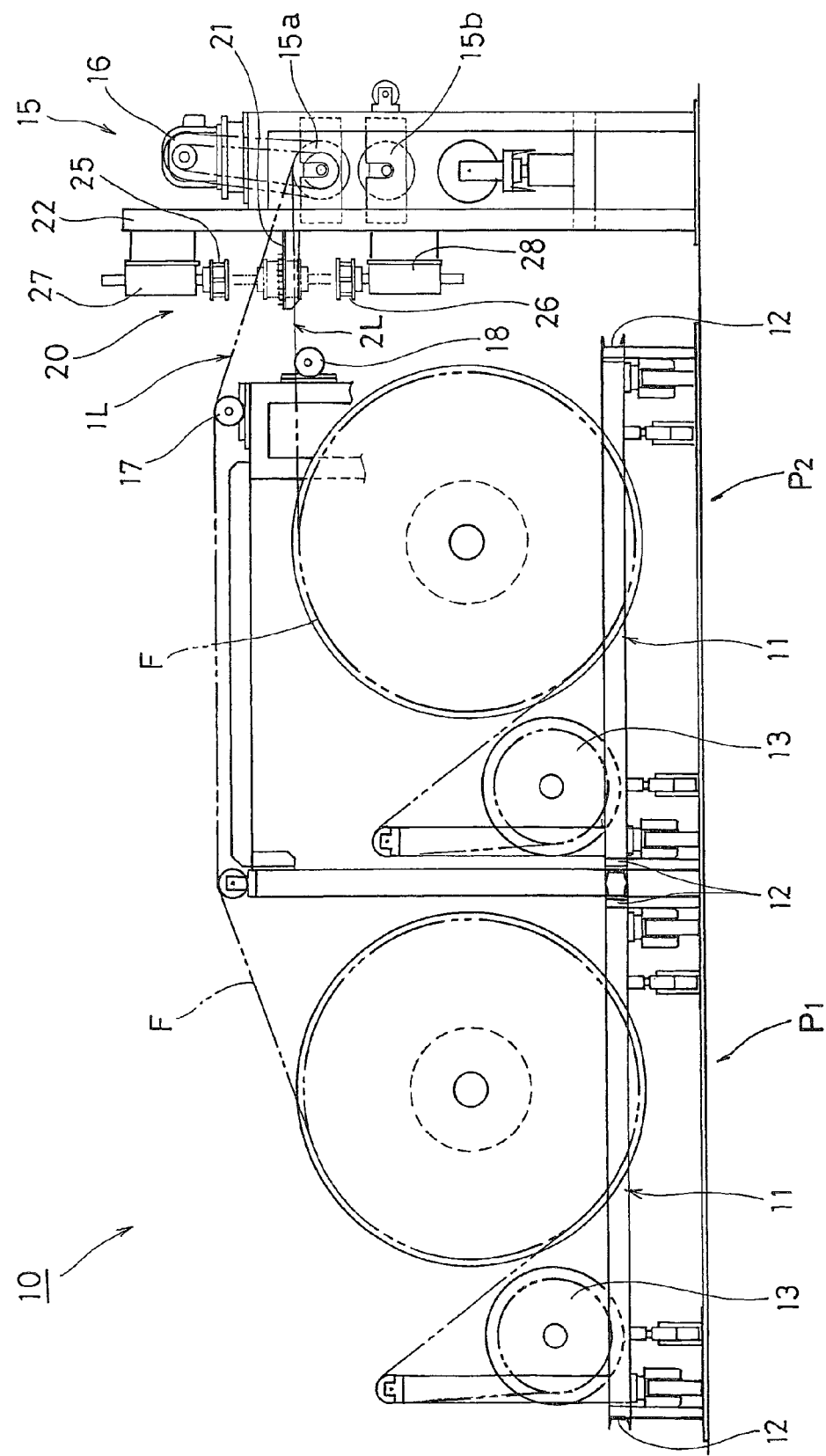
FIG. 2 is an enlarged side view to show an essential portion on a side of a supply portion of the calendar line showing an embodiment of the invention.
Figure 3:
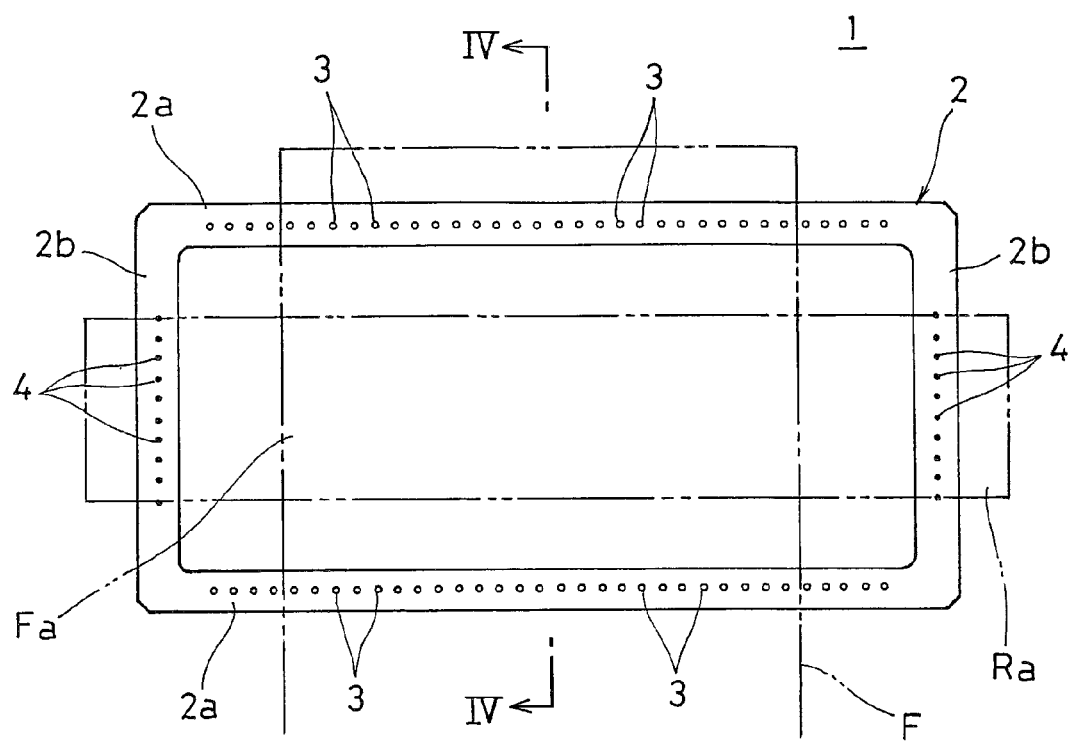
FIG. 3 is a plane view of a jointing holder used in the invention.
Figure 4:
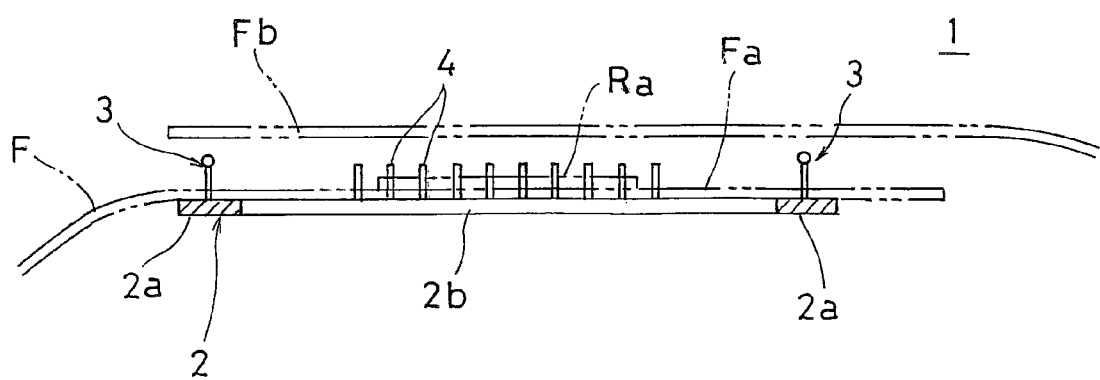
FIG. 4 is a sectional view taken along a line IV-IV of the same.
Figure 5:
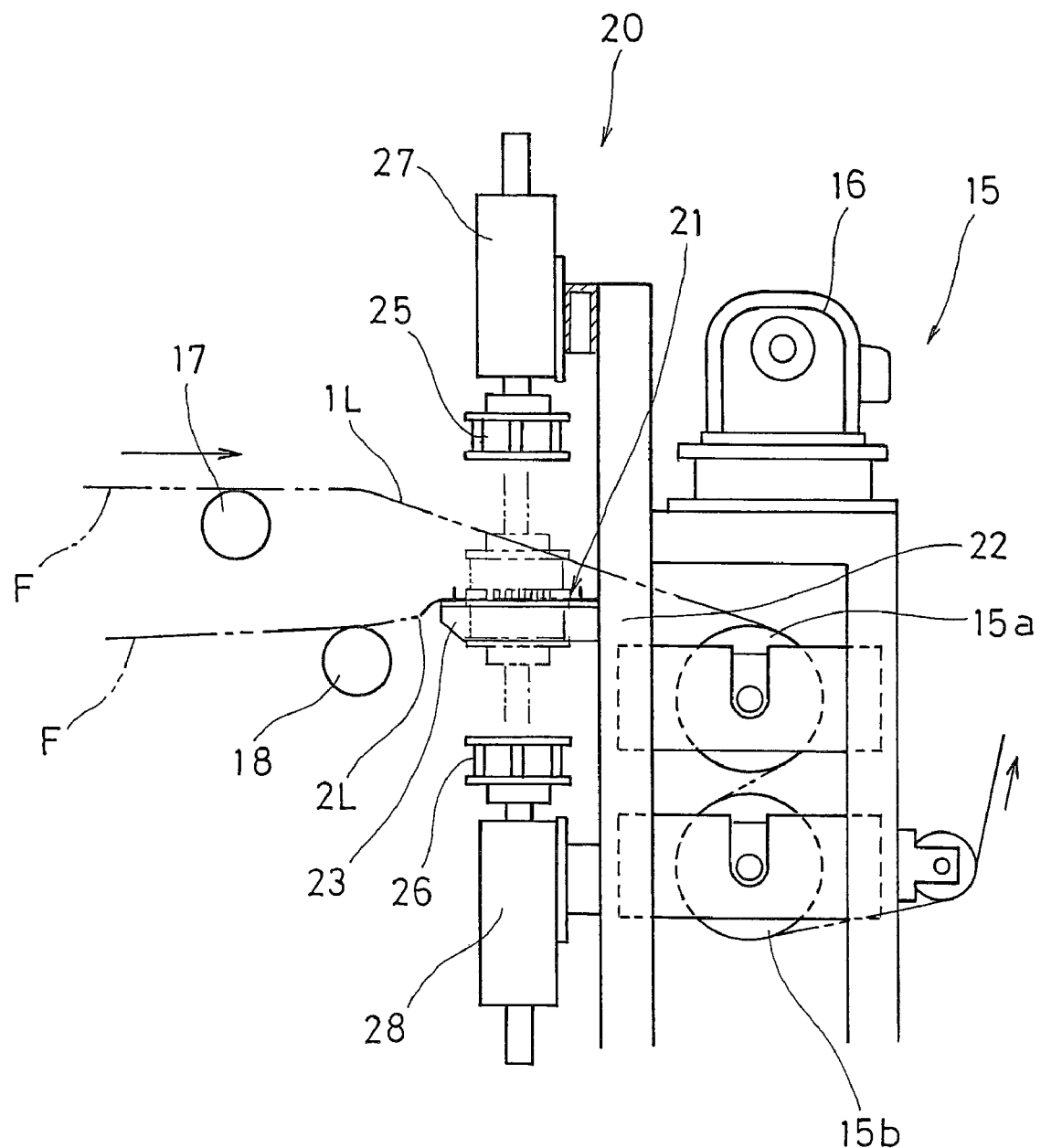
FIG. 5 is a side view of a state of drawing to supply cord fabric from a transfer portion on an upper side at a portion of a joint apparatus of the invention.
Figure 6:
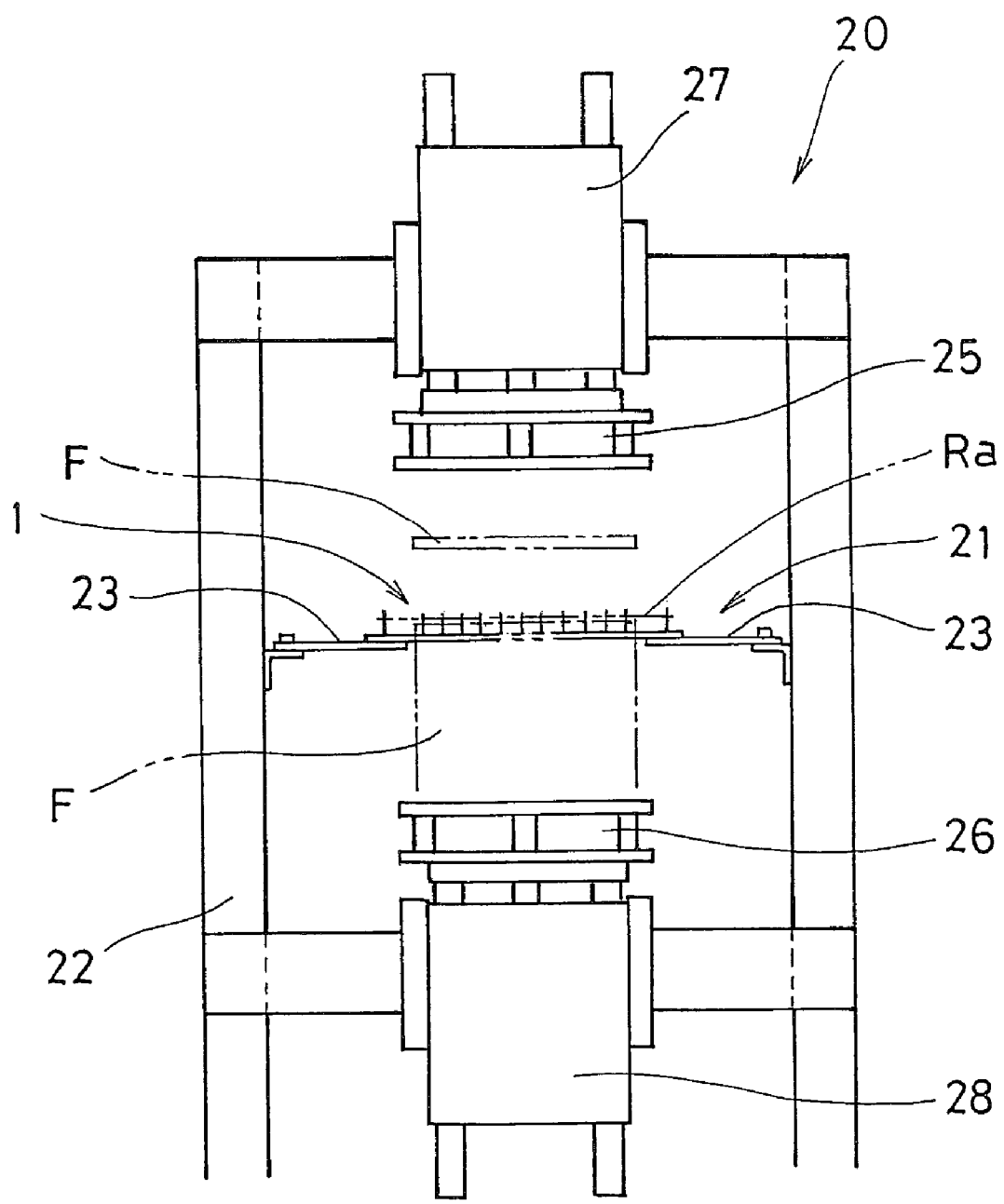
FIG. 6 is a front view of the portion of the joint apparatus in the above-described state.
Figure 7:
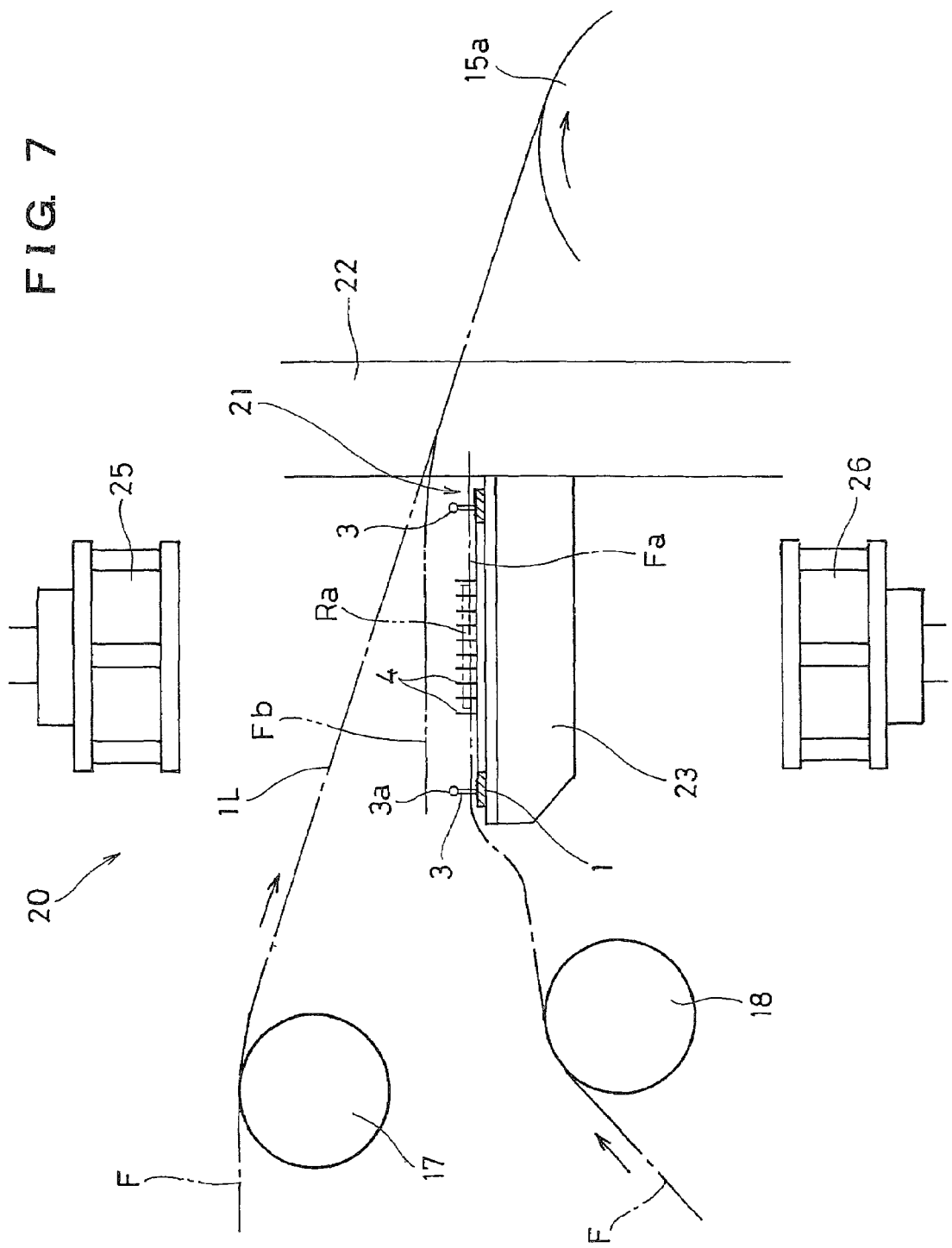
FIG. 7 is an enlarged explanatory view before jointing of the same.
Figure 8:
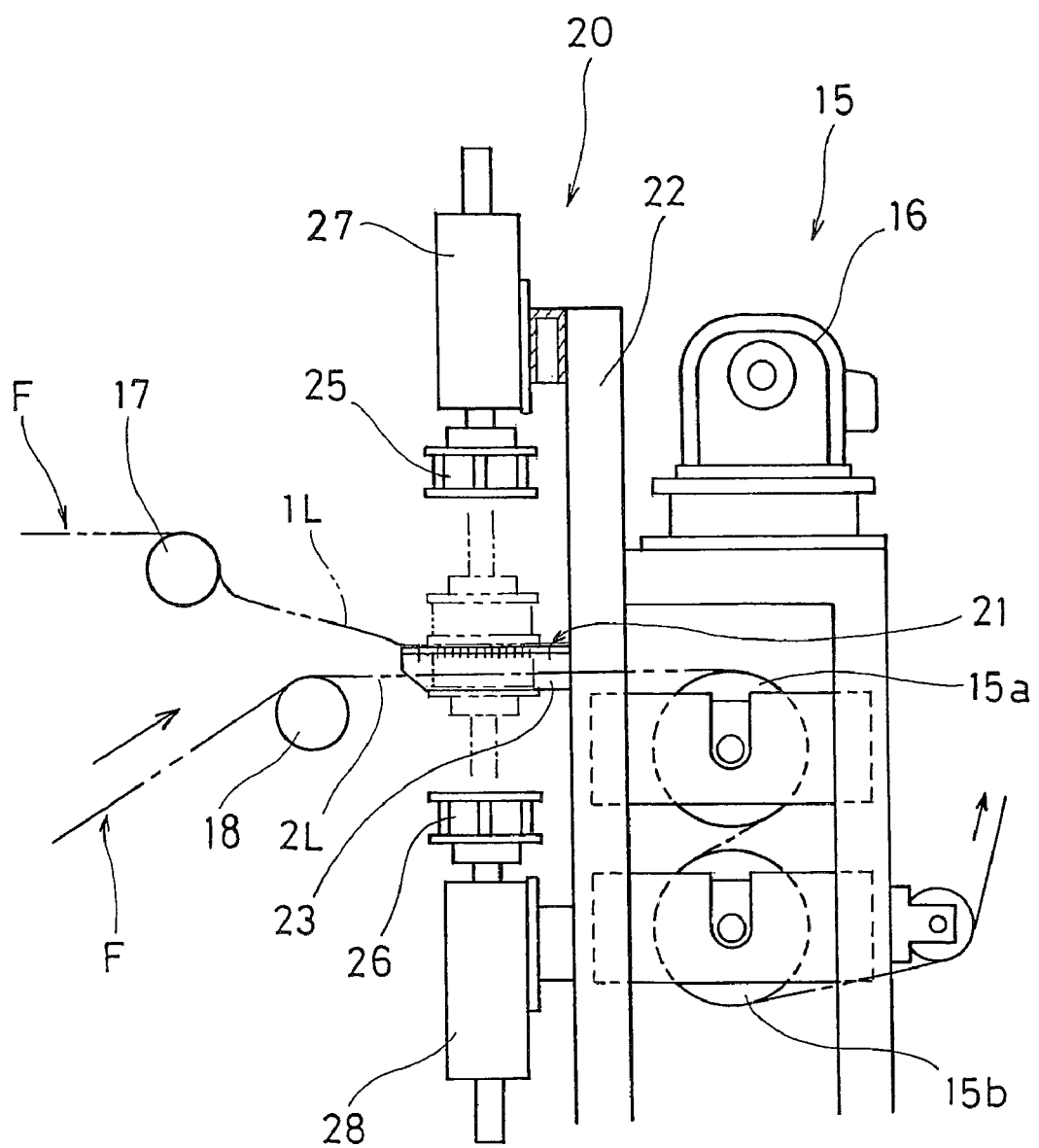
FIG. 8 is a side view of a state of drawing to supply cord fabric from a transfer portion on a lower side at the portion of the joint apparatus of the invention.
Figure 9:
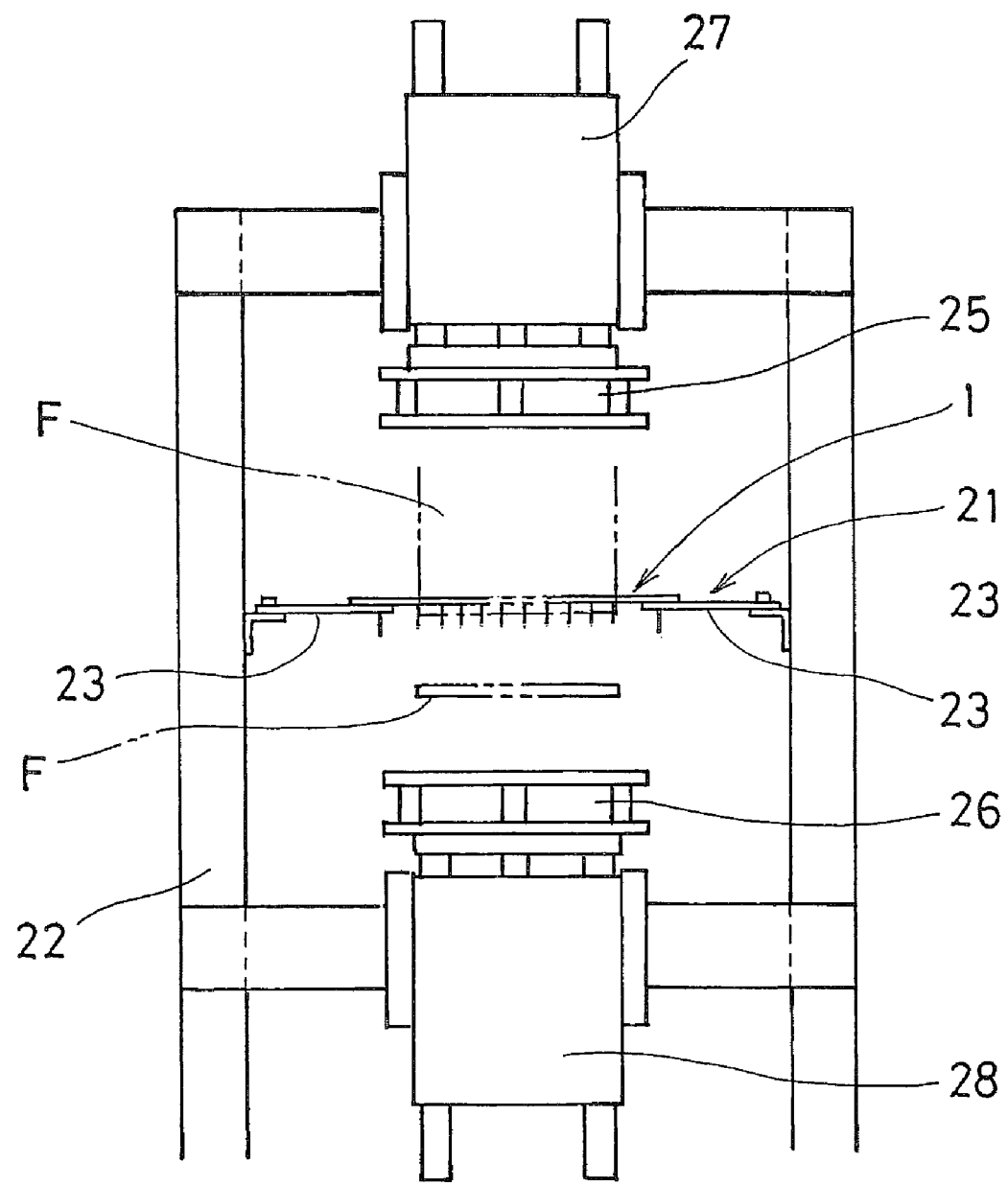
FIG. 9 is a front view of the portion of the joint apparatus in the above-described state.
Figure 10:
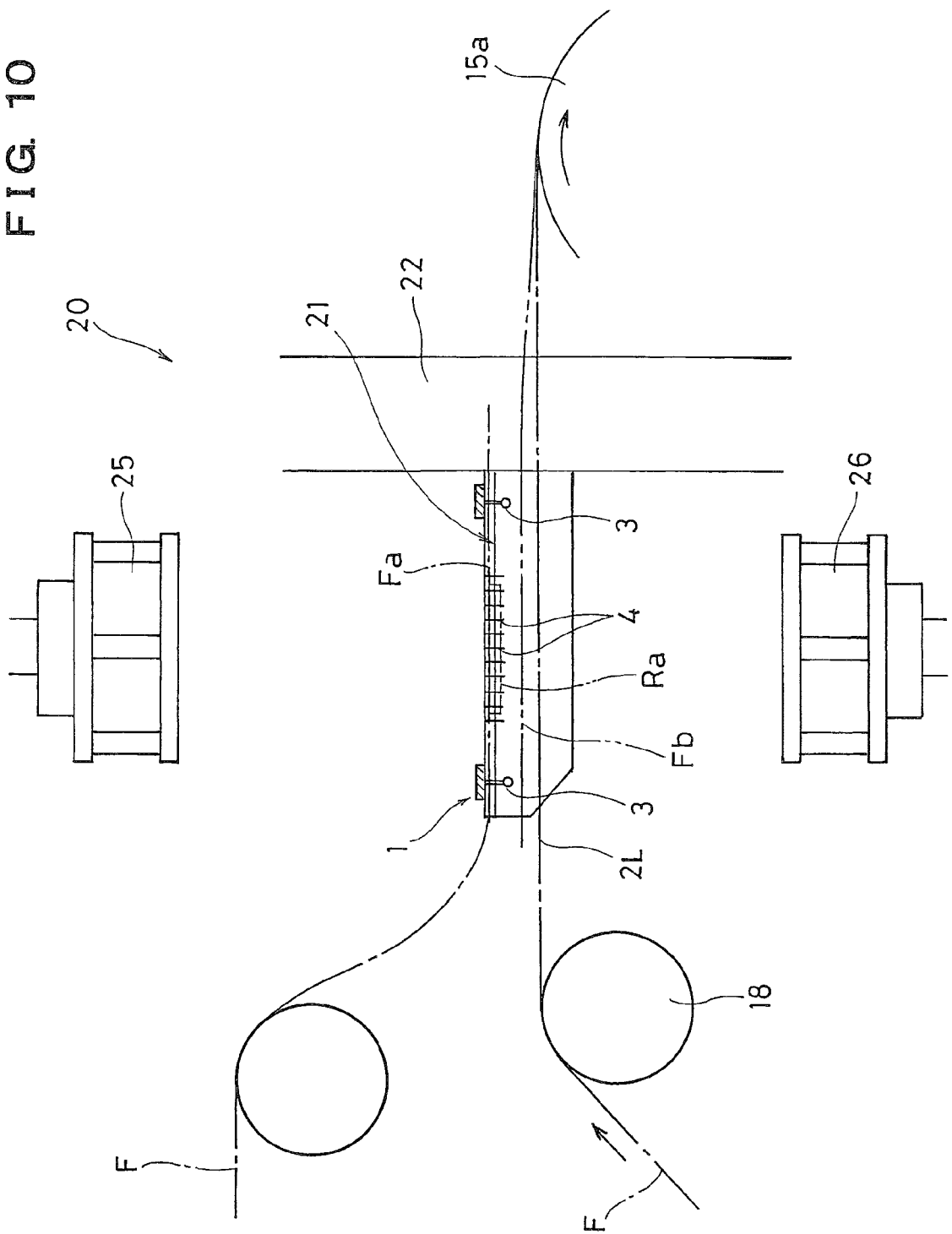
FIG. 10 is an enlarged explanatory view before jointing of the same.
Figure 11:
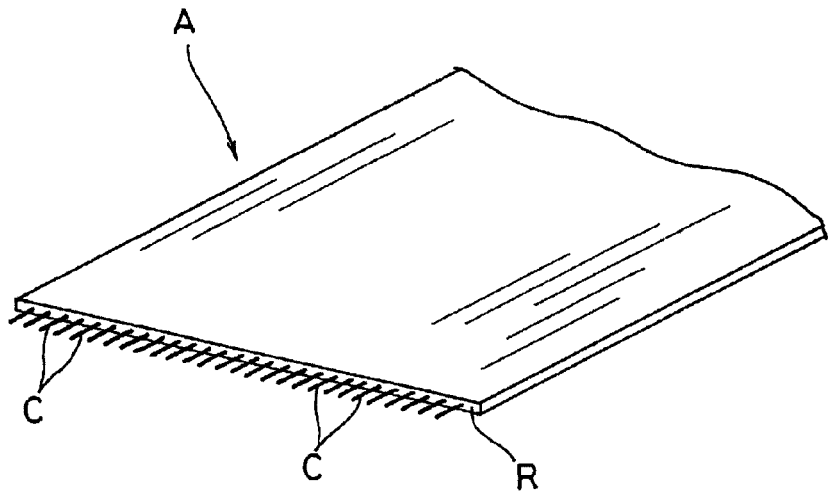
FIG. 11 is a perspective view substantially showing a topping sheet.
Figure 12:
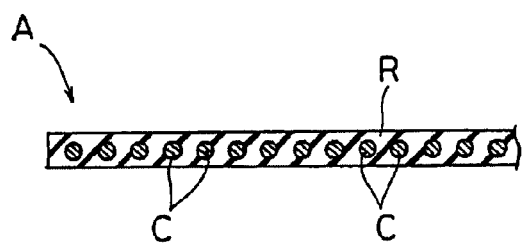
FIG. 12 is an enlarged sectional view of a portion of the topping sheet.
Figure 13:
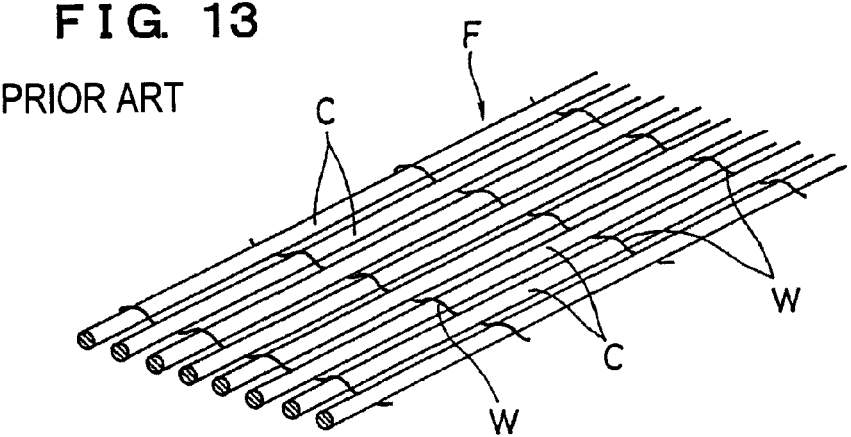
FIG. 13 is a perspective view substantially showing cord fabric.

A . . . topping sheet, C . . . cord, F . . . cord fabric, Fa . . . start end portion, Fb . . . finish end portion, 1L . . . transfer portion on upper side, 2L . . . transfer portion on lower side, P1, P2 . . . supply positions, R . . . rubber, Ra . . . rubber member for jointing, W . . . weft, 1 . . . jointing holder, 2 . . . frame-like member, 2a, 2a . . . two side portions on long side, 2b, 2b . . . two side portions on short side, 3 . . . locking pin, 3a . . . head portion in small ball shape, 4 . . . locking pin, 10 . . . supply portion, 11 . . . carriage, 12 . . . installing guise, 13 . . . winding portion of separating cloth, 15 . . . drawing apparatus, 15a, 15b . . . transferring rollers, 16 . . . drive motor, 17, 18 . . . drawing guide rollers, 20 . . . jointing apparatus, 21 . . . jointing mounting portion, 22 . . . frame portion, 23, 23 . . . receive plates, 25, 26 . . . press members, 27, 28 . . . cylinder apparatus, 30 . . . festoon apparatus, 31 . . . centering apparatus, 40 . . . weft removing apparatus, 45 . . . dancer apparatus, 50 . . . calendar apparatus, 51, 51 . . . upper and lower calendar rolls, 55 . . . dancer apparatus, 60 . . . cooling apparatus, 70 . . . festoon apparatus, 71 . . . centering apparatus, 80 . . . reeling apparatus, 81 . . . reel carriage, 82 . . . reel position switching apparatus.

The invention claimed is:

1. A method of jointing a cord fabric which is a method of jointing a cord fabric for drawing to supply cord fabric constituted by being woven by constituting warp by a number of pieces of cords from two supply positions set to a supply portion alternately continuously one by one in a calender line for topping rubber to a number of pieces of aligned cords by a calender roll;

wherein during drawing to supply the cord fabric from one of the two supply positions, by using a jointing holder capable of holding a start end portion of the cord fabric in a stretched state, the start end portion of the cord fabric drawn from other thereof is held by the holder and set to a jointing mounting portion in a state of pasting an unvulcanized jointing rubber member to the start end portion; and wherein when a final end of the cord fabric on one side of the cord fabric comes closer, a finish end portion of the cord fabric on the one side is pasted to the start end portion of the cord fabric on other side of the cord fabric held by the holder of the jointing mounting portion by interposing the jointing rubber member, the finish end portion and the start end portion are jointed by way of the rubber member by being squeezed from upper and lower sides, thereafter, by removing the holder, the cord fabric on the other side is made to be able to be drawn to be supplied continuously to the cord fabric on the one side.

2. The method of jointing cord fabric in a calender line according to claim 1, wherein the jointing holder projected with a plurality of locking pins capable of piercing the cord fabric is used, and the start end portion of the cord fabric is set to the jointing mounting portion in a state of being locked to be held by the locking pins.

3. The method of jointing cord fabric in a calender line according to claim 1 or 2, wherein a transfer portion reaching a drawing apparatus of the cord fabric on the one side drawn from the one of the supply positions and a transfer portion reaching the drawing apparatus of the cord fabric on the other side drawn from the supply position on the other side are made to be disposed at positions different from each other in an up and down direction, the jointing mounting portion is provided at a middle position of the transfer portions, when the cord fabric on the one side passing the transfer portion on an upper side is drawn, the jointing holder is set by directing the start end portion of the cord fabric on the other side held by the jointing holder to an upper side, further, when the cord fabric on the other side passing the transfer portion on a lower side is drawn to be supplied, the holder is set by directing the start end portion of the cord fabric on the one side held by the holder to a lower side.

\* \* \* \* \*